United States Patent [19]

Webb

[11] 4,068,454
[45] Jan. 17, 1978

[54] CROP GATHERING REEL ASSEMBLY

[75] Inventor: Bryant F. Webb, Ephrata, Pa.

[73] Assignee: Sperry Rand Corporation, New Holland, Pa.

[21] Appl. No.: 718,639

[22] Filed: Aug. 30, 1976

[51] Int. Cl.² ............................................. A01D 57/02
[52] U.S. Cl. .................................................... 56/220
[58] Field of Search ............................... 56/219–227, 56/14.3–14.6

[56] References Cited

U.S. PATENT DOCUMENTS

| 470,061 | 3/1892 | Lindley | 56/226 |
|---|---|---|---|
| 2,506,980 | 5/1950 | Verger | 56/227 |
| 3,555,796 | 1/1971 | Baumeister | 56/221 |
| 3,664,101 | 5/1972 | Hurlburt | 56/220 |
| 3,722,194 | 3/1973 | Halls | 56/226 |

Primary Examiner—Russell R. Kinsey
Attorney, Agent, or Firm—John R. Flanagan; Frank A. Seemar; John B. Mitchell

[57] ABSTRACT

A harvesting machine has an improved crop gathering reel assembly which includes an elongated tubular drive member rotatably mounted to the machine, at least one pair of spaced apart unitary spiders, a plurality of tine-carrying bars extending generally parallel to the tubular member and interconnecting the spiders, joint members mounting the spiders to the tubular member for universal articulation relative to the member and a guide plate structure stationarily mounted to the machine adjacent one of the spiders for positioning the spiders in generally parallel planes disposed at predetermined oblique angles relative to the tubular member. The angles are generally equal and predetermined such that, upon predetermined rotation of the tubular member, the spiders rotate therewith within the aforementioned planes and concurrently universally articulate relative to the tubular member so that the tine-carrying bars will engage and sweep crop laterally and toward the harvesting machine.

9 Claims, 7 Drawing Figures

U.S. Patent  Jan. 17, 1978  Sheet 1 of 4  4,068,454
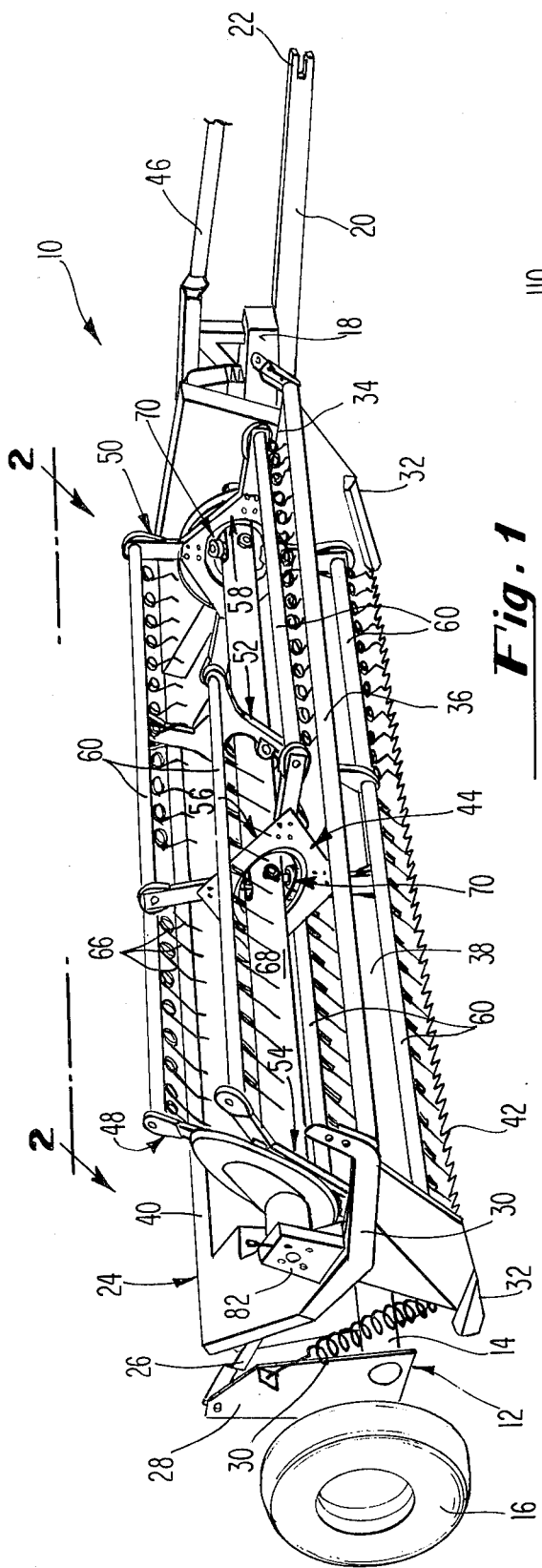
Fig. 1
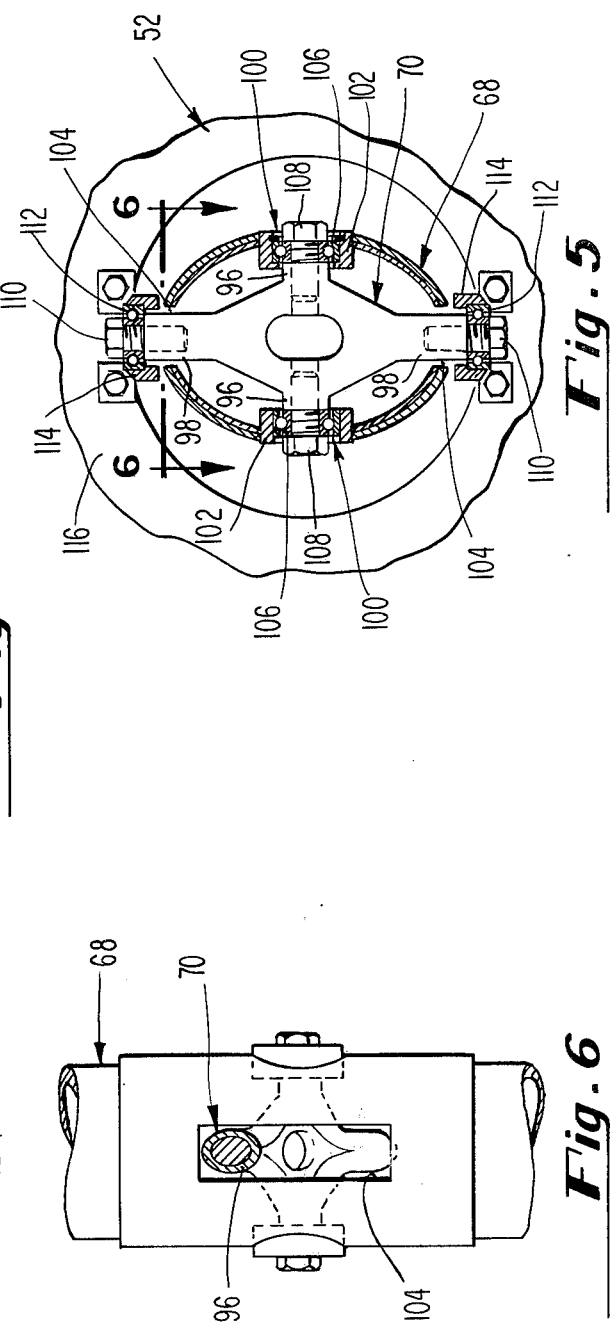
Fig. 5
Fig. 6

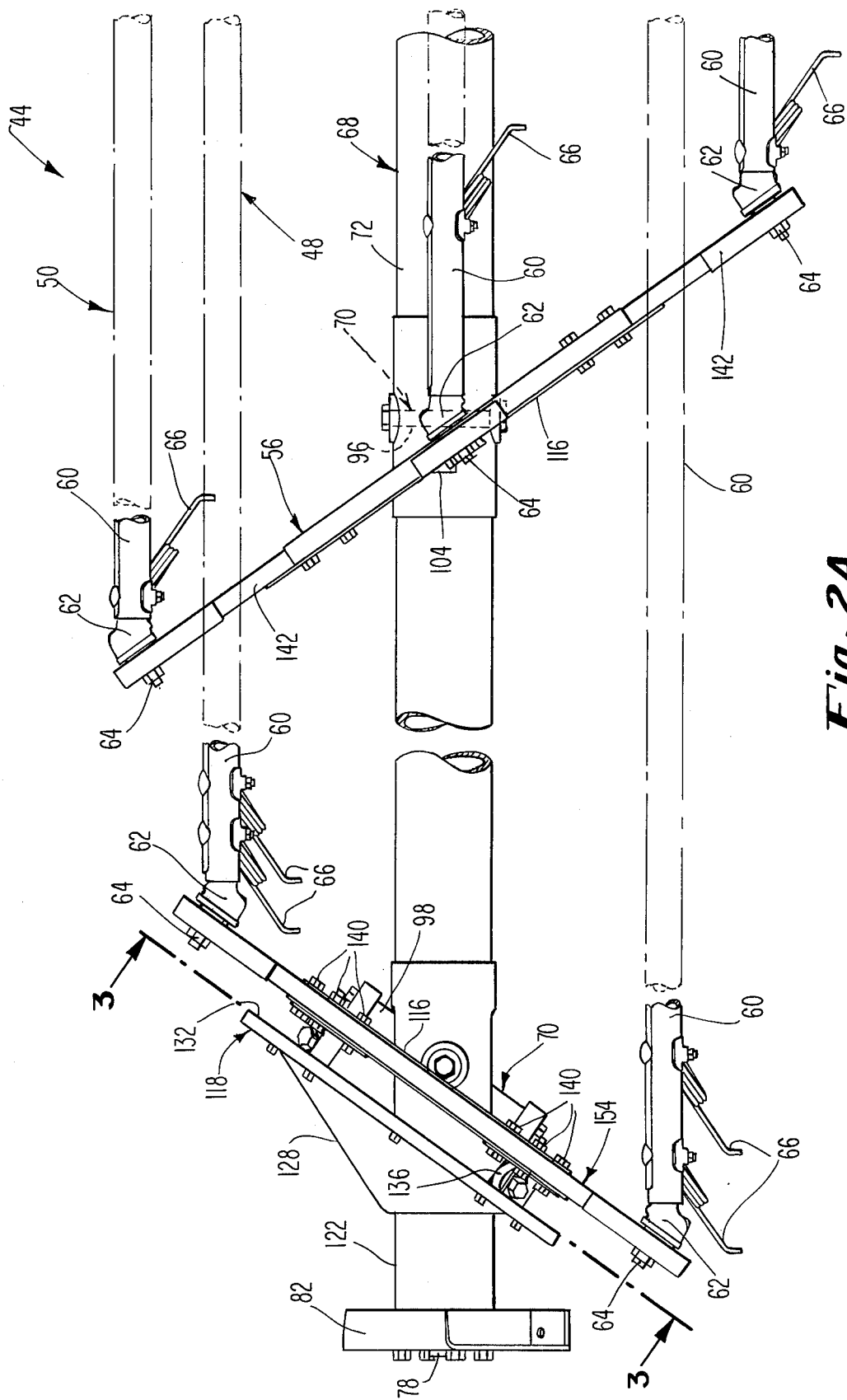

CROP GATHERING REEL ASSEMBLY

BACKGROUND OF THE INVENTION

1. Field of the Invention

The present invention relates generally to agricultural harvesting machines and, more particularly, is concerned with an improved crop gathering reel assembly therefor.

2. Description of the Prior Art

The present invention provides a crop gathering reel assembly for a harvesting machine which constitutes an improvement over that disclosed and illustrated in U.S. Pat. Nos. 3,664,101 and 3,724,183 which issued respectively on May 23, 1972 and Apr. 3, 1973 to Joseph C. Hurlburt and are assigned to the same assignee as the present invention.

The prior art reel assembly disclosed in the aforesaid patents included a transverse stationarily-disposed main hollow support tube and multiple reel sections disposed generally in side-by-side relationship along the support tube with each reel section including at least two spiders rotatably bearing around the surface of the support tube. The drive train for the reel assembly included at least one internal bevel gear coaxially fixed to a particular spider of each reel section and disposed such that it surrounds the main support tube, a main drive shaft journalled for rotation within the main support tube and a series of pinion gears spaced along the main drive shaft and fixed thereto so as to be exposed through openings formed within the main support tube and particularly spaced for meshing engagement with respective internal gears on the respective spiders of the reel sections. Also, a support structure was mounted on the main support tube adjacent each of the spiders having the internal gear and a roller was rotatably mounted on the support structure. The roller was vertically spaced relative to each of the pinion gears and engaged with the respective internal gear so as to maintain engagement between the respective pinion gears and internal gears.

While the main drive shaft of this prior art reel assembly did not have to shoulder the burden of supporting the reel assembly and advantageously drove the reel assembly at numerous points therealong as opposed to driving a single end portion of a main reel shaft as done previously, many of the essential components incorporated by this prior art assembly, such as large diameter ball bearings and gears, were expensive, hard to service and lacking in durability.

SUMMARY OF THE INVENTION

The improved reel assembly of the present invention eliminates the large diameter ball bearings and gears and thereby the problems experienced heretofore with these components. Specifically, the improved assembly does not have to be completely disassembled to replace its major drive components. Also, each of the spiders of the improved assembly are driven via their unique connections with the main drive tubular member of the assembly.

Accordingly, the present invention relates to an improved crop gathering reel assembly for a harvesting machine which includes shaft means in the form of an elongated tubular drive member rotatably mounted to the machine, at least one pair of spaced apart support members in the form of a pair of spaced apart unitary spiders, a plurality of crop-engaging members in the form of tine-carrying bars extending generally parallel to the tubular member and interconnecting the spiders and means in the form of joint members mounting the spiders to the tubular member for universal articulation relative thereto. Also, the improved reel assembly includes means in the form of a guide plate structure mounted to the harvesting machine for positioning the spiders in generally parallel planes disposed at predetermined oblique angles relative to the tubular member. The angles are generally equal and predetermined such that, upon predetermined rotation of the tubular member, the spiders rotate therewith within the aforementioned parallel planes and concurrently universally articulate relative to the drive tube so that the tine-carrying bars will engage and sweep crop laterally and toward the harvesting machine.

More particularly, each of the joint members is disposed within an elongated hollow portion of the tubular member and has first and second oppositely-extending pairs of trunnions. The first pair of trunnions is arranged in orthogonal relationship to the second pair of trunnions. Furthermore, the hollow tube portion has defined therein at the location of each of the joint members a pair of diametrically-opposed openings within which respectively the first pair of trunnions of each respective joint member are rotatably mounted so as to define a first axis of articulation for each respective spider relative to the tubular member and a pair of diametrically opposed slots which are elongated in the direction of the rotational axis of the tubular member and disposed in orthogonal relationship to the pair of openings in the tubular member. The second pair of trunnions of each respective joint member extend outwardly respectively through the pair of slots and rotatably mount the respective one spider for articulation about a second axis relative to the tubular member which is orthogonally-arranged relative to the first axis.

Still further, the guide plate structure is a stationary member having a generally planar surface disposed adjacent to and facing toward one of the spiders. The surface extends at a predetermined oblique angle relative to the tubular member and a series of angularly spaced apart roller elements rotatably mounted on the one spider engage the surface such that both of the spiders are maintained at such predetermined angle relative to the tubular member during their rotation with the tubular member.

Other advantages and attainments of the improved reel assembly provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 1 is a perspective view of a pull-type mower-conditioner harvesting machine incorporating the improved crop gathering reel assembly comprising the present invention;

FIGS. 2A and 2B taken together are an enlarged fragmentary view of the improved reel assembly as seen from along line 2—2 of FIG. 1;

FIG. 5 is an enlarged fragmentary elevational view of one of the joint members being mounted within the tubular drive member of the improved reel assembly; and FIG. 6 is a top plan view taken along line 6—6 of FIG. 5.

DETAILED DESCRIPTION OF THE INVENTION

Figure 2B:
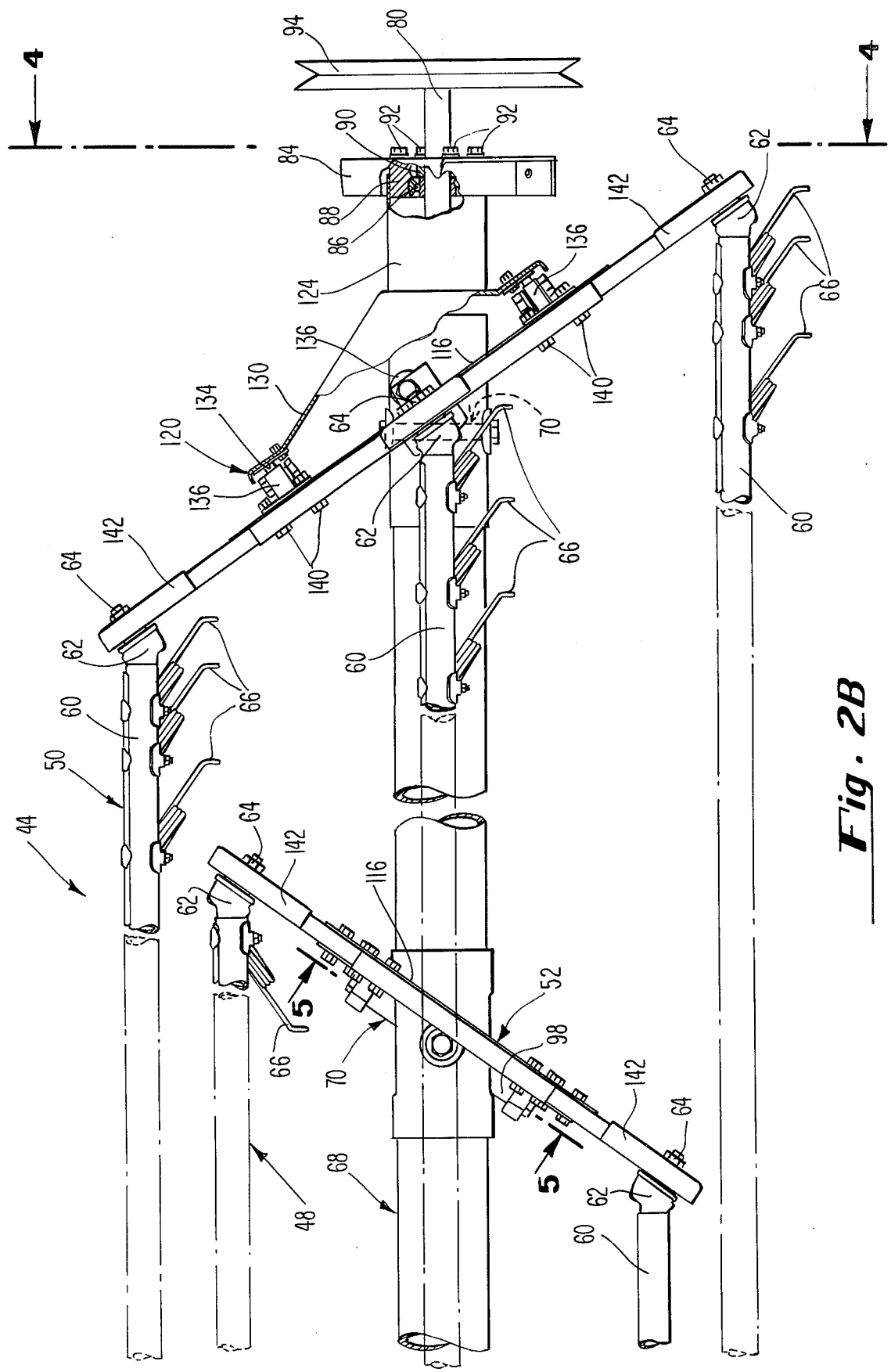
Figure 3:
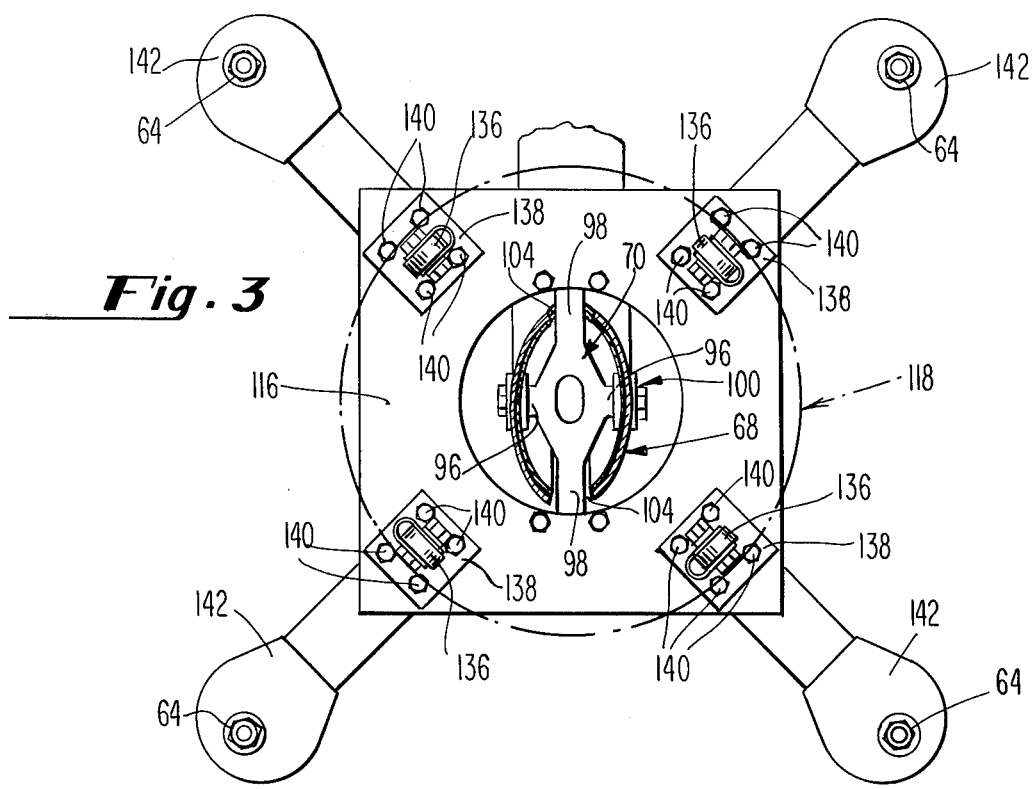
FIG. 3 is a right end elevational view taken along line 3—3 of FIG. 2A, showing the outer spider of the right reel section and a joint member mounting the spider to the transverse main tubular drive member for universal articulation relative to the tubular member.

In the following description, right hand and left hand references are determined by standing at the rear of the harvesting machine and facing in the direction of forward travel. Also, in the following description, it is to be understood that such terms as "forward," "left," "upwardly," etc., are words of convenience and are not to be construed as limiting terms.

IN GENERAL

Referring now to the drawings, and particularly to FIG. 1, there is shown a harvesting machine in the form of a pull-type mower-conditioner, being indicated generally by the numeral 10. The harvesting machine 10 is provided with an L-shaped frame, indicated generally at 12, which includes a main pipe frame member 14 which is movably supported on a pair of spaced apart left and right rear ground wheels 16 (only the right wheel being shown) and extends in a transverse relationship to the intended direction of forward travel of the machine across the field during the performance of harvesting operations. The frame 12 also includes a hitch frame member 18 which is pivotally mounted at its rearward end to the left end of the main frame member 14 and maintained in a desired angular position with respect to the main frame member 14 by linkage (not shown) and a hydraulic cylinder (not shown) disposed at the left end of member 14 and interconnecting the left end of member 14 and the rearward end of hitch frame member 18. A tongue 20 is connected to the forward end of the hitch frame member 18 and extends forwardly therefrom. The tongue 20 has a clevis 22 at its forward end for coupling the mobile frame 10 to a towing tractor.

The harvesting machine 10 is provided with a header 24 having operative harvesting components. The header 24 is supported from the main frame member 14 so as to be disposed forwardly thereof and adjacent the inboard side of the hitch frame member 18. Specifically, the header 24 is carried by a parallel four bar linkage system that includes a lower link (not shown) and an upper link 26 disposed rearwardly of each side of the header 24. The upper links 26 pivotally interconnect rear upper portions of the header 24 with upright support members 28 (only the right one being seen in FIG. 1) being fixed on opposite end portions of the main frame member 14, while the lower links pivotally interconnect rear lower portions of the header 24 with the frame member 14. The header 24 is biased upwardly by left and right spring structures 30 interconnecting the header 24 with the respective upright members 28 (only the right spring structure being seen in FIG. 1). About the bottom portion of the header 24, at each side thereof, there is provided a shoe 32 which engages the ground as the header 24 flotatably moves over various undulations in the ground. The spring structures 30 in biasing the header 24 upwardly provide the flotation characteristic of the header 24.

With reference to the general frame structure of the header 24, it will be seen from FIG. 1 that a pair of laterally spaced, rearwardly converging side sheets 34 are provided. Front portions of the side sheets 34 are interconnected by a pusher bar 36, while a floor 38 interconnects rear bottom portions of the side sheets 34. Formed about the rear of the header 24 and extending rearwardly therefrom is shield structure 40 (a front transverse portion of which is seen in FIG. 1) which acts on cut crop material being dishcarged by the harvesting unit 10 to form it into a windrow.

The header 24 includes various components that act on the crop material during the operation of the harvesting machine 10. In this regard, a sickle bar 42 is disposed transversely across a lower front portion of the header 24 along the front edge of the floor 38. Spaced upwardly and rearwardly from the sickle bar 42 along the rear edge of the floor 38 and under the forward portion of the shield structure 40 are upper and lower cooperating transversely-extending conditioning rolls (not shown) which are rotatably mounted within the header 24 and receive the cut crop, condition it and discharge it rearwardly to the shield structure. Mounted forwardly of the rolls and above the sickle bar 42 is an improved crop gathering reel assembly 44 which engages the standing crop and sweeps the same when cut rearwardly and laterally across the floor 38 to the conditioning rolls.

Suitable mechanisms for driving the various operating components of the harvesting machine 10 are mounted at the left side of the header 24 and on the hitch frame member 18. Such mechanisms are substantially the same as those illustrated and described in U.S. Pat. No. 3,724,183 and, therefore, need not be described in detail herein for a thorough and complete understanding of the present invention. Rotary motion is transmitted to these components via a driveline 46 which extends forwardly above the hitch frame member 18 and the tongue 20 and is adapted at its forward end for connection to the power takeoff shaft of the towing tractor.

IMPROVED CROP GATHERING REEL ASSEMBLY

Referring still to FIG. 1, but more particularly to FIGS. 2A and 2B, there is illustrated the improved crop gathering reel assembly 44 of the present invention. The reel assembly 44 preferably includes right and left coaxial reel sections 48, 50. The reel sections at their opposite ends respectively have inner and outer support members in the form of spiders 52, 54 and 56, 58. A series of four tine bars 60 (only two being seen in FIGS. 2A and 2B) extend between and are interconnected to the inner and outer spiders of each reel section by bearings 62 mounted on studs 64 which are fastened on the outer ends of the respective spiders. Depending from each tine bar 60 is a series of laterally spaced generally downwardly extending tines 66 (only a few of which are seen in FIGS. 2A and 2B) that during operation engage the crop material and sweep it downwardly past the sickle bar 42 where the standing crop material is cut and then rearwardly over the floor 38 to the conditioning rolls.

The improved reel assembly 44 further includes an elongated tubular drive member 68 and means, such as joint members 70, for mounting the ends of the reel sections 48, 50 to the tubular drive member 68 for universal articulation relative thereto.

Figure 4:
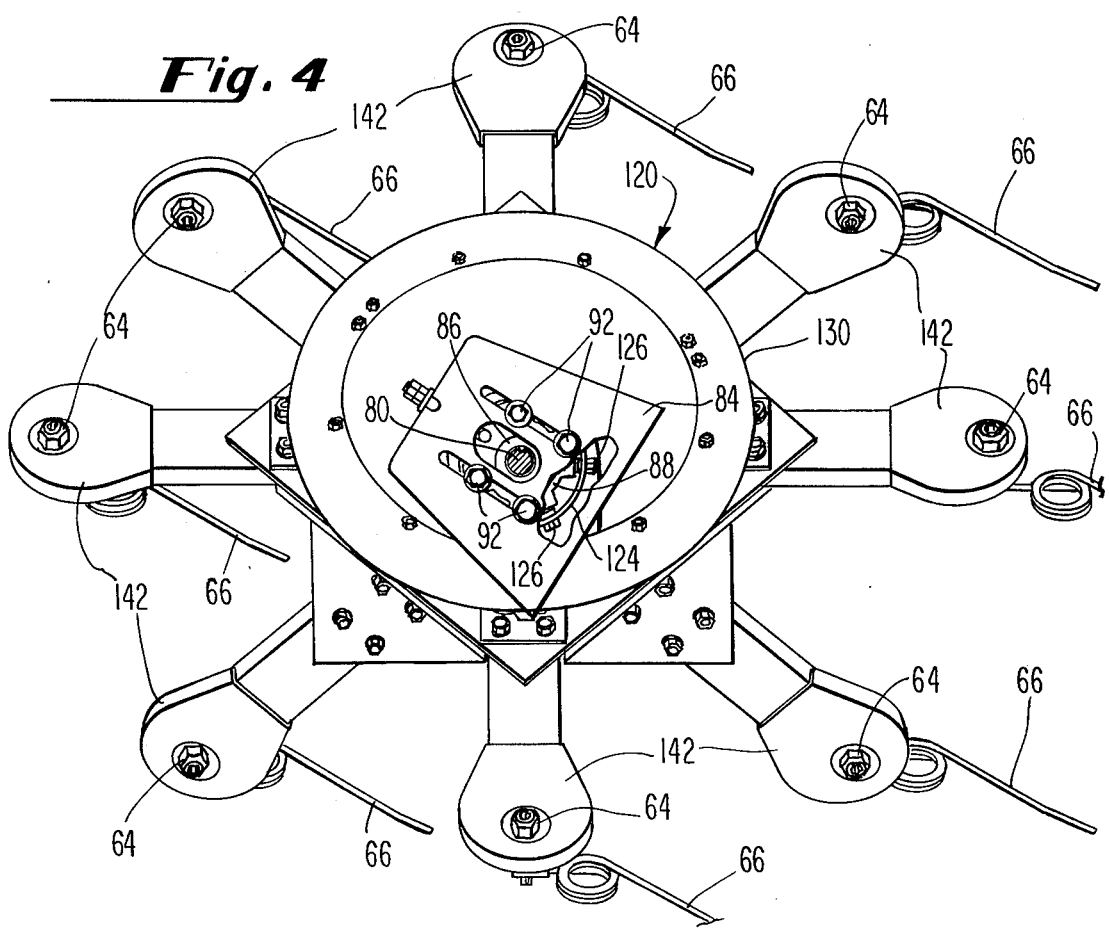
FIG. 4 is a left end elevational view taken along line 4—4 of FIG. 2B, showing the left support for the main tubular member of the reel assembly, the angular guide plate structure for the left reel section, the outer spider of the left reel section and the inner spider of the right reel section.

The elongated drive member 68 is comprised by a hollow tube 72 having annular blocks fixed within its opposite ends with stub shafts 78, 80 coaxially extending relative to the tube 72 and at their inner ends through respective central openings in the blocks. Each of the inner shaft ends is fixedly mounted through a respective block. The elongated drive member 68 is rotatably mounted on the machine 10 by right and left support brackets 82, 84 which are respectively mounted to the tops of and extend generally upright from the laterally spaced, rearwardly converging right and left side sheets 34 of the frame structure of the header 24. The outer end portions of the respective stub shafts 78, 80 are rotatably supported by bearings 86 being confined within bearing housings 88 by collars 90 being secured on the shafts 78, 80 (only the bearing, collar and bearing housing associated with the left support bracket are seen in FIGS. 2A, 2B, and 4). The bearing housings 88 are respectively attached to the support brackets 82, 84 by bolts 92. A large diameter sheave 94 is attached on the outer end of the left stub shaft 80 for drivingly transmitting rotary motion from suitable mechanisms (not shown) located at the left side of the header 24 to the main tubular drive member 68 so as to cause rotation thereof in a clockwise direction, as viewed in FIG. 1.

Referring to FIGS. 2, 3, 5 and 6, it will be seen that each of the inner and outer spiders 52, 54 and 56, 58 of the reel sections 48, 50 is supported on and driven by the tubular drive member 68 by one of the plurality of joint members 70. Each of the joint members 70 is formed with first and second oppositely-extending pairs of trunnions 96, 98, with the first pair of trunnions 96 being arranged in orthogonal relationship to the second pair of trunnions 98. The joint members 70 are spaced apart along the tubular member 68 in correspondence to the desired spaced apart relationship between the spiders. The hollow tube 72 of the elongated tubular drive member 68 has defined therein at the location of each of the joint members 70 a pair of diametrically opposed openings 100 being formed therein by bearing housings 102 and a pair of diametrically opposed rectangular-shaped slots 104 which are elongated in the direction of the rotational axis of the tubular drive member 68 and disposed in orthogonal relationship to the pair of openings 100. Each of the joint members 70 is disposed within the hollow tube 72 at such respective locations of the openings 100 and slots 104. The first pair of trunnions 96 of each joint member 70 are rotatably mounted respectively within one pair of the openings 100 by anti-friction bearings 106 to which the trunnions 96 are secured by bolts 108, the bearings 106 being thereby confined within the bearing housings 102 which define the pair of openings 100. The second pair of trunnions 98 of each joint member 70 extend outwardly respectively through one pair of slots 104 and rotatably mount the respective one of the spiders 52, 54, 56, 58 being disposed at that particular location. Specifically, the outer ends of the second trunnions are secured by bolts 110 to anti-friction bearings 112 rotatably mounted with bearing housings 114 being mounted on box frame section 116 of the respective spider. Thus, the first pair of trunnions 96 are mounted to the tubular drive member 68 for rotation about a first axis which extends in generally transverse, radial relationship to the rotational axis of the member 68. The second pair of trunnions 98 mount one of the spiders for rotation about a second axis which extends in a generally transverse, or orthogonal, relationship to the first axis. It will be readily apparent that, through such arrangement of the axes of rotation and rotatable connections with the spiders and drive member 68 as provided by the joint members 70, the respective spiders 52, 54, 56, 58 are capable of universal articulation relative to the drive member 68, such articulation being defined by concurrent pivoting of the spiders about both the first and second axes defined by the respective pairs of trunnions 96, 98 of the joint members 70.

Finally, the improved reel assembly 44 includes means in the form of right and left guide plate structures 118, 120 for positioning or slanting the respective inner and outer spiders of the right reel section 48 at a predetermined first oblique angle relative to the tubular drive member 68 and for positioning or slanting the respective inner and outer spiders of the left reel section 50 at a second angle relative to the tubular drive member 68 being opposite to the predetermined first angle. As seen in FIG. 2, the opposite angles are about 55° relative to the rotational axis of the tubular member 68 such that, upon clockwise rotation of the tubular drive member 68 as viewed in FIG. 1, the reel sections 48, 50 rotate with the member 68, with the respective spiders 52, 54 and 56, 58 being disposed at the respective first and second angles relative to the member 68 and concurrently universally articulating relative thereto so that the tines 66 of the tine bars 60 interconnecting the respective spiders will engage and sweep crop material in a converging manner laterally and rearwardly toward the machine 10.

As seen in FIGS. 2A and 2B, the guide plate structures 118, 120, per se, have identical constructions, but as incorporated into the reel assembly 44 one structure 118 is positioned so as to constitute a mirror image of the other structure 120. The structures 118, 120 respectively have outer tubular sections 122, 124 coaxially aligned with the elongated tubular drive member 68 and encircling portions of the opposite stub shafts 78, 80 of the same. The tubular sections 122, 124 at their respective outer cylindrical edge portions are fitted about and fastened by bolts 126 to the bearing housings 88 which are respectively attached to the support brackets 82, 84. The structures 118, 120 also respectively have inner conical-shaped sections 128, 130 being connected to the respective inner cylindrical edge portions of the tubular sections 122, 124 thereof. The peripheral edge portions 132, 134 of the respective conical-shaped sections 128, 130 form generally planar guide surfaces disposed adjacent to and facing toward the outer sides of the outer spiders 54, 58 of the respective right and left reel sections 48, 50. The planes defined by the peripheral surfaces 132, 134 are disposed at the aforementioned predetermined first and second oblique angles reltives to the tubular drive member 68. The outer spiders 54, 58 at the outer sides of their respective box frame sections 116 have a series of four angularly spaced roller bearing elements 136 which are rotatably mounted by bracket plates 138 fixed on sections 116 by bolts 140. A series of four angularly spaced arms 142 comprising the parts of each of the spiders which mount the tine bars 60 are radially disposed relative to the rotation axis of the spiders and clamped to the box frame structures 116 thereof by the same bolts 140 which mount the bracket plates 138. The roller elements 136 are aligned along a circular path which coincides with the peripheral planar surfaces 132, 134 of the guide plate structures 118, 120 and engaged in rolling contact thereagainst. In such arrangement, the outer and inner spiders of the reel sections are maintained in planes that are parallel to the respective surfaces 132, 134 throughout rotation of the spiders with the tubular drive member 68.

In FIG. 2, it is noted that the inner portions of the respective reel sections 48, 50 are disposed in overlapping relationship with the time bars 60 and the spider arms 142 of each reel section being in staggered relationship. The cooperation of the crop converging action fostered by such arrangement of the reel sections with other operative harvesting components of the header 24 and the advantages gained therefrom are described in aforementioned U.S. Pat. No. 3,664,101 and, therefore, need not be described in detail herein for a complete and thorough understanding of the present invention.

Also, while the improved reel assembly 44 of the present invention has been described and illustrated in associated with a mower-conditioner harvesting machine, it should be understood that the assembly 44 may be readily incorporated into other types of harvesting machines, whether pull-type or self-propelled.

It is thought that the improved reel assembly of the present invention and many of its attendant advantages will be understood from the foregoing description and it will be apparent that various changes may be made in the form, construction and arrangement of its parts without departing from the spirit and scope of the invention or sacrificing all of its material advantages, the form hereinbefore described being merely a preferred or exemplary embodiment thereof.

Having thus described the invention, what is claimed is:

1. An improved crop gathering reel assembly for a harvesting machine, comprising:
    shaft means mounted to said machine for rotation about a transverse axis;
    at least one pair of spaced apart support members;
    a plurality of crop-engaging members extending between and interconnecting the peripheries of said support members;
    means mounting each of said support members to said shaft means for universal articulation relative to said shaft means; and
    means mounted to said machine for positioning said support members in generally parallel planes disposed at predetermined oblique angles relative to said transverse rotational axis of said shaft means such that, upon predetermined rotation of said shaft means, said support means rotate therewith within said planes and concurrently universally articulate relative thereto so that said crop-engaging members interconnecting said support members will engage and sweep crop rearwardly and laterally to said harvesting machine.

2. An improved crop gathering reel assembly as recited in claim 1, wherein said positioning means includes a generally planar surface portion disposed adjacent to and facing toward one of said support members and extending at a predetermined oblique angle relative to said transverse rotational axis of said shaft means, said one support member having a series of angularly spaced apart roller elements rotatably mounted thereon and engaged with said planar surface portion of said positioning means.

3. An improved crop gathering reel assembly as recited in claim 1, wherein said mounting means is comprised by a pair of joint members being spaced apart in correspondence to the spaced apart relationship between said support members, each of said joint members being mounted to said shaft means for rotation about a first axis which extends in a generally transverse relationship to said rotational axis of said shaft means, each of said support members being mounted to one of said joint members for rotation about a second axis which extends in a generally transverse relationship to said first axis.

4. An improved crop gathering reel assembly as recited in claim 3, wherein:
    said shaft means includes an elongated hollow tubular portion;
    each of said joint members being disposed within said hollow tubular portion and having first and second oppositely-extending pairs of trunnions, said first pair of trunnions being arranged in orthogonal relationship to said second pair of trunnions; and
    said elongated hollow tubular portion having defined therein at the location of each of said joint members a pair of diametrically-opposed openings within which respectively said first pair of trunnions of said respective joint member are rotatably mounted so as to define said first axis and a pair of diametrically opposed slots which are elongated in the direction of the rotational axis of said shaft means and disposed in orthogonal relationship to said pair of openings, said second pair of trunnions of said respective joint member extending outwardly respectively through said pair of slots and rotatably mounting said respective support member so as to define said second rotation axis of said support member.

5. An improved crop gathering reel assembly for a harvesting machine, comprising:
    an elongated tubular drive member rotatably mounted to said machine;
    at least one pair of spaced apart unitary spiders;
    a plurality of tine-carrying bars extending generally parallel to said tubular member and interconnecting said spiders;
    joint members mounting said spiders to said tubular member for universal articulation relative thereto about a pair of orthogonally arranged axes; and
    means mounted to said machine adjacent one of said spiders and being engaged therewith for maintaining said spiders in generally parallel planes disposed at generally equal predetermined oblique angles relative to said tubular member such that, upon predetermined rotation of said tubular member, said spiders rotate therewith within said planes and concurrently universally articulate relative to said tubular member about said axes so that said tine-carrying bars will engage and sweep crop laterally and toward said harvesting machine.

6. An improved crop gathering reel assembly as recited in claim 5, wherein:
    said tubular drive member includes an elongated hollow tubular portion;
    each of said joint members being disposed within said hollow tubular portion and having first and second oppositely extending pairs of trunnions, said first pair of trunnions being arranged in orthogonal relationship to said second pair of trunnions; and said elongated hollow tubular portion having defined therein at the location of each of said joint members a pair of diametrically opposed openings within which respectively said first pair of trunnions of said respective joint member are rotatably mounted so as to define the first axis of said pair of orthogonally arranged axes and a pair of diametrically opposed slots which are elongated in the direction of the rotational axis of said tubular member and disposed in orthogonal relationship to said pair of openings, said second pair of trunnions of said respective joint member extending outwardly respectively through said pair of slots and rotatably mounting a respective one of said spiders so as to define the second axis of said pair of orthogonally-arranged axes.

7. An improved crop gathering reel assembly as recited in claim 5, wherein said means for maintaining said spiders in generally parallel planes includes a plate structure having a generally planar guide surface portion disposed adjacent to and facing toward said one spider and extending at said predetermined oblique angle relative to said tubular member, said one spider having a series of circumferentially spaced apart roller elements rotatably mounted thereon and engaged with said planar guide surface portion of said plate structure.

8. An improved crop gathering reel assembly for a harvesting machine, comprising:

shaft means mounted to said machine for rotation about a transverse axis;

at least one crop-engaging reel section extending along said shaft;

spaced apart joint members mounting respective opposite lateral ends of said reel section to said shaft means for universal articulation relative to said shaft means; and means stationarily mounted to said machine adjacent one of said lateral ends of said reel section and in engagement therewith for positioning said opposite ends of said reel section at a predetermined oblique angle relative to said transverse rotational axis of said shaft means such that, upon predetermined rotation of said shaft means, said reel section rotates therewith with its ends disposed at said angle relative to said shaft means and concurrently universally articulating relative thereto so as to engage and sweep crop rearwardly and laterally to said harvesting machine.

9. An improved crop gathering reel assembly for a harvesting machine, comprising:

shaft means mounted to said machine for rotation;

a pair of crop-engaging reel sections extending along said shaft means and having adjacent inner ends and remote outer ends;

means mounting each of said ends of said reel sections to said shaft means for universal articulation relative to said shaft means; and means mounted to said machine for slanting said respective inner and outer ends of one of said reel sections at a predetermined first angle relative to said shaft means and for slanting said respective inner and outer ends of the other of said reel sections at a second angle relative to said shaft means being opposite to said predetermined first angle such that, upon predetermined rotation of said shaft means, said reel sections rotate therewith with their ends disposed at said respective first and second angles relative to said shaft means and concurrently universally articulating relative thereto so as to engage and sweep crop in a converging manner toward said machine.

* * * * *